United States Patent
Kim et al.

(10) Patent No.: US 7,667,813 B2
(45) Date of Patent: Feb. 23, 2010

(54) MULTI-DOMAIN LIQUID CRYSTAL DISPLAY DEVICE AND METHOD FOR MANUFACTURING THE SAME

(75) Inventors: Woo Hyun Kim, Seoul (KR); Seung Ho Park, Seoul (KR)

(73) Assignee: LG Display Co., Ltd., Seoul (KR)

( * ) Notice: Subject to any disclaimer, the term of this patent is extended or adjusted under 35 U.S.C. 154(b) by 239 days.

(21) Appl. No.: 11/607,875

(22) Filed: Dec. 4, 2006

(65) Prior Publication Data

US 2007/0139596 A1 Jun. 21, 2007

(30) Foreign Application Priority Data

Dec. 21, 2005 (KR) .................. 10-2005-0127239

(51) Int. Cl.
G02F 1/1333 (2006.01)
G02F 1/1337 (2006.01)
G02F 1/13 (2006.01)

(52) U.S. Cl. .............. 349/160; 349/129; 349/130; 349/158; 349/187

(58) Field of Classification Search ........... 349/129, 349/130, 158, 159, 160, 187, 191
See application file for complete search history.

(56) References Cited

U.S. PATENT DOCUMENTS

| | | | |
|---|---|---|---|
| 6,965,421 B2* | 11/2005 | Tsuchiya | 349/125 |
| 7,227,608 B2* | 6/2007 | Matsumoto et al. | 349/141 |
| 2004/0080695 A1* | 4/2004 | Choi et al. | 349/130 |

FOREIGN PATENT DOCUMENTS

| | | |
|---|---|---|
| JP | 09-184913 A | 7/1997 |
| JP | 2003-255395 A | 9/2003 |
| JP | 2005-070146 A | 3/2005 |

* cited by examiner

*Primary Examiner*—Uyen-Chau N Le
*Assistant Examiner*—John M Bedtelyon
(74) *Attorney, Agent, or Firm*—Birch, Stewart, Kolasch & Birch, LLP (57) ABSTRACT

A multi-domain liquid crystal display (LCD) device including first and second substrates facing each other, gate and data lines crossing each other on the first substrate to thereby form a pixel region, a pixel electrode formed in the pixel region of the first substrate, a laser-irradiated groove having a predetermined width and depth in the surface of the second substrate, a common electrode formed in the second substrate having a predetermined step coverage generated by the surface of the second substrate and the groove, and a liquid crystal layer formed between the first and second substrates.

8 Claims, 7 Drawing Sheets

Laser Irradiation

MULTI-DOMAIN LIQUID CRYSTAL DISPLAY DEVICE AND METHOD FOR MANUFACTURING THE SAME

This application claims the benefit of the Korean Patent Application No. P2005-127239, filed on Dec. 21, 2005, which is hereby incorporated by reference in its entirety.

BACKGROUND OF THE INVENTION

1. Field of the Invention

The present invention relates to a liquid crystal display (LCD) device, and more particularly, to a multi-domain LCD device which includes a valley formed by irradiating a laser beam, and a simplified method for manufacturing the same.

2. Discussion of the Related Art

The demand for various display devices has increased. Accordingly, various flat display devices such as a liquid crystal display (LCD), a plasma display panel (PDP), an electroluminescent display (ELD), and a vacuum fluorescent display (VFD) have been developed.

Among the various flat display devices, the LCD devices are used most widely due to advantageous characteristics of a thin profile, a lightness in weight, and low power consumption. Thus, the LCD devices are a substitute for a Cathode Ray Tube (CRT). In addition to mobile type LCD devices such as a display for a notebook computer, LCD devices have been developed for computer monitors and televisions.

Despite various technical developments in the LCD technology, research in enhancing the picture quality of the LCD device has been in some respects lacking as compared to other features and advantages of the LCD device. Therefore, in order to use the LCD device as a general display, an LCD having a high quality picture, such as high resolution and high luminance with a large-sized screen while still maintaining lightness in weight, thinness, and low power consumption is needed.

Generally, an LCD device includes an LCD panel that displays images, and a driver that applies a driving signal to the LCD panel. Further, the LCD panel includes first and second glass substrates that are bonded to each other at a predetermined interval, and a liquid crystal layer formed between the first and second substrates.

In addition, the first glass substrate (TFT array substrate) includes a plurality of gate lines, a plurality of data lines, a plurality of pixel electrodes, and a plurality of thin film transistors. The plurality of gate lines are formed at fixed intervals in a first direction, and the plurality of data lines are formed at fixed intervals in a second direction perpendicular to the first direction to thereby define a plurality of pixel regions. Then, the plurality of pixel electrodes, which are arranged in a matrix-type configuration, are respectively formed in the pixel regions. Also, the plurality of thin film transistors are switched according to signals of the gate lines so as to transmit signals of the data lines to the respective pixel electrodes.

In addition, the second glass substrate (color filter substrate) includes a black matrix layer that excludes light from regions except the pixel regions of the first glass substrate, a color filter layer of R(red)/G(green)/B(blue) for displaying various colors, and a common electrode to represent the picture image.

Further, the LCD device is driven according to optical anisotropy and polarizability of the liquid crystal material. That is, liquid crystal molecules of the liquid crystal layer are aligned using directional characteristics, because the liquid crystal molecules have a long and thin shape. In this respect, an induced electric field is applied to the liquid crystal material to control the alignment direction of the liquid crystal molecules. That is, when the alignment direction of the liquid crystal molecules is controlled by the induced electric field, the light is polarized and changed by the optical anisotropy of the liquid crystal, thereby displaying a picture image.

Further, the alignment of the liquid crystal molecules depends on the dielectric anisotropy of the liquid crystal formed between the first and second glass substrates. For example, a Twisted Nematic TN mode corresponds to the dielectric anisotropy of the liquid crystal being the positive type. A Vertical Alignment VA mode corresponds to the dielectric anisotropy of the liquid crystal being the negative type.

Also, one pixel region of the LCD device may be divided into a plurality of domains, which is referred to as a multi-domain mode. A multi-domain LCD device is advantageous, because it has a good picture quality and wide viewing angle. Further, it is also possible to combine the multi-domain mode with a vertical alignment (VA) mode, which is referred to as a multi-domain vertical alignment MVA mode.

Hereinafter, a related art MVA mode LCD device will be explained with reference to FIGS. 1-4.

Figure 1:
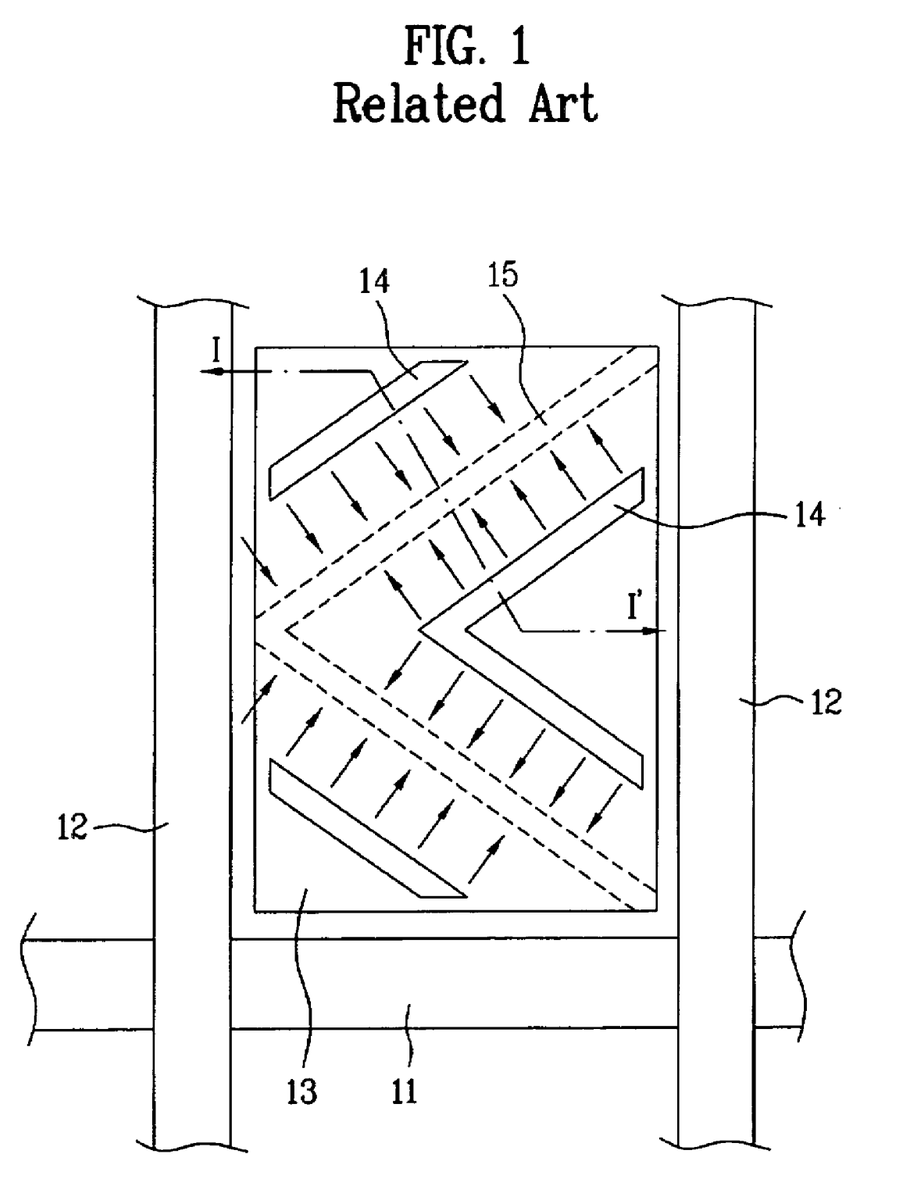
FIG. 1 is a plane view illustrating a multi-domain LCD device according to the related art.
Figure 2:
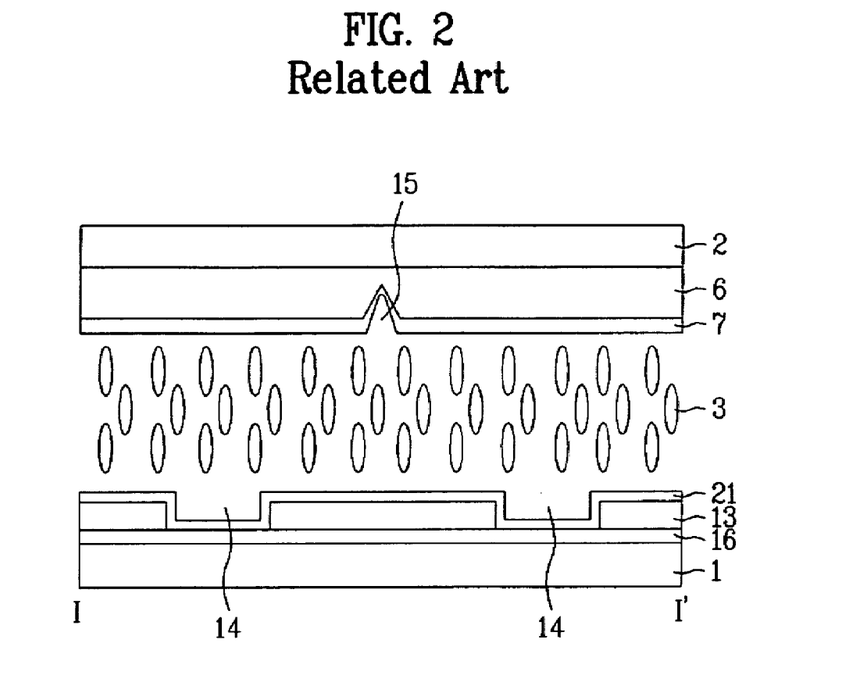
FIG. 2 is a cross sectional view illustrating a black state of a multi-domain LCD device along I-I' of FIG. 1.
Figure 3:
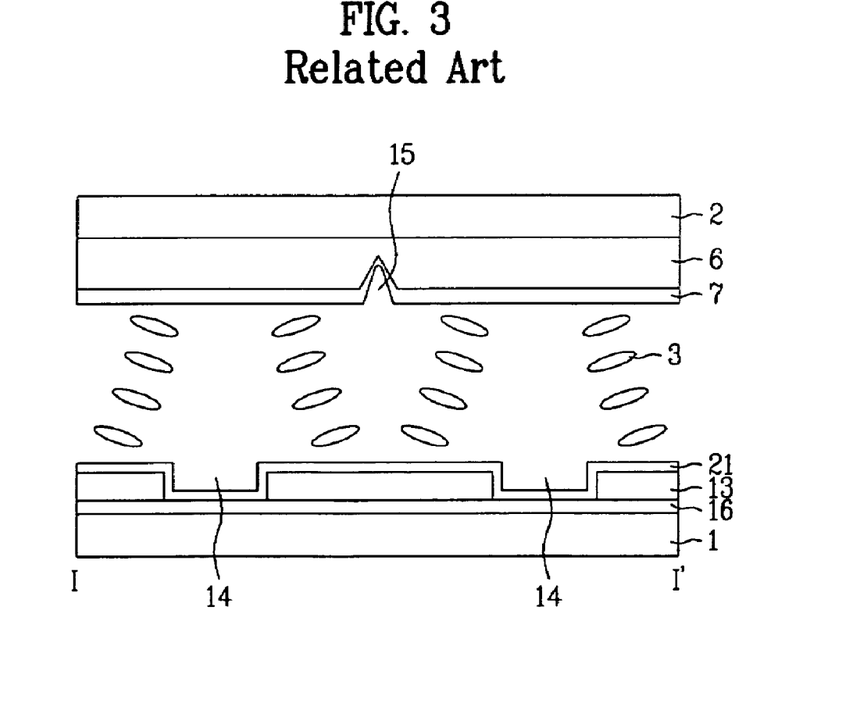
FIG. 3 is a cross sectional view illustrating a white state of a multi-domain LCD device along I-I' of FIG. 1.

As shown in FIGS. 2 and 3, the related art MVA mode LCD device includes a lower substrate 1, an upper substrate 2, and a liquid crystal layer 3. As shown in FIG. 1, the lower substrate 1 includes a gate line 11, a data line 12, a thin film transistor, and a pixel electrode 13. In addition, the gate line 11 is formed perpendicular to the data line 12 to thereby define a unit pixel region. Then, the thin film transistor (not shown) is formed adjacent to a crossing portion of the gate and data lines 11 and 12. The pixel electrode 13 is formed in the unit pixel region, and includes one or more transmitting parts 14 positioned at fixed intervals.

As shown in FIGS. 2 and 3, the upper substrate 2 includes a black matrix layer (not shown), a color filter layer 6 of red(R)/green(G)/blue(B), and a common electrode 7. The black matrix layer is formed corresponding to other portions except the pixel region (gate and data lines), and the color filter layer 6 is formed corresponding to the pixel region. Then, the common electrode 7 is formed on an entire surface of the upper substrate 2 including the color filter layer 6.

Also, a valley 15 is formed in the upper substrate 2 at a portion between the transmitting parts 14 of the pixel electrode 13. As shown, the valley 15 is patterned in a surface of the color filter layer 6, and the common electrode 7 is formed on the color filter layer 6 including the valley 15. Thus, the common electrode 7 includes a predetermined step coverage of the color filter layer 6 due to the valley 15.

In addition, the related art MVA mode LCD device also includes an alignment layer 21 formed on facing surfaces of the lower and upper substrates 1 and 2, or on any one of the lower and upper substrates 1 and 2. Further, the alignment layer 21 is rubbed such that the alignment layer 21 has a vertical pretilt angle. In FIGS. 2 and 3, the alignment layer 21 is formed only on the lower substrate 1.

The related art device also includes an insulating layer 16. The insulating layer 16 includes a gate insulating layer formed between the gate line 11 and the data line on the lower substrate 1, and a passivation layer formed between the data line 12 and the pixel electrode 13 on the lower substrate 1.

Also, the above MVA mode LCD device uses the liquid crystal 3 having the negative dielectric anisotropy. A voltage is then applied to the pixel electrode 13 through the thin film transistor to align the liquid crystal 3. The alignment of liquid crystal will now be explained according to a white or black state.

The related art MVA mode LCD device is normally represented in a black mode. As shown in FIG. 2, during the voltage-off state, the MVA mode LCD device is in a black state. That is, the liquid crystal is aligned vertically due to the alignment layer 21 formed on the lower or upper substrate 1 or 2 and rubbed in a vertical direction, whereby the LCD device is in the black state.

As the voltage is applied to the MVA mode LCD device, as shown in FIG. 3, a vertical electric field is generated between the common electrode 7 of the upper substrate 2 and the pixel electrode 13 of the lower substrate 1. Thus, molecules of the liquid crystal 3 are tilted adjacently towards a horizontal surface. In this instance, the vertical electric field may be distorted due to the valley 15 and the transmitting part 14. That is, an electric field of equipotential is generated to be tilted relative to the valley 15 and the transmitting part 14. Then, the liquid crystal 3 is aligned in a vertical direction with respect to the equipotential line. At this time, the transmitting part 14 and the valley 15 function as a boundary between domains having the different alignment directions of liquid crystal.

In addition, form the valley 15 in the upper substrate 2, a mask is used for forming the color filter layer 6. The mask includes a semi-transmission part corresponding to the valley 15, and transmission and closed parts corresponding to the other portions except the valley 15. That is, a predetermined portion of the color filter layer 6 corresponding to the valley 15 is removed at a predetermined thickness, and the other portions of the color filter layer 6 corresponding to the pixel region are kept intact. Then, the color filter layer 6 corresponding to the other portions except the pixel region is completely removed.

For example, if the color filter layer 6 has the thickness of 1~2 μm, the removed predetermined portion of the color filter layer 6 corresponding to the valley 15 is about half of the entire thickness thereof. At this time, the width of the valley 15 in the surface of the color filter layer 6 is about 7 μm.

Figure 4:
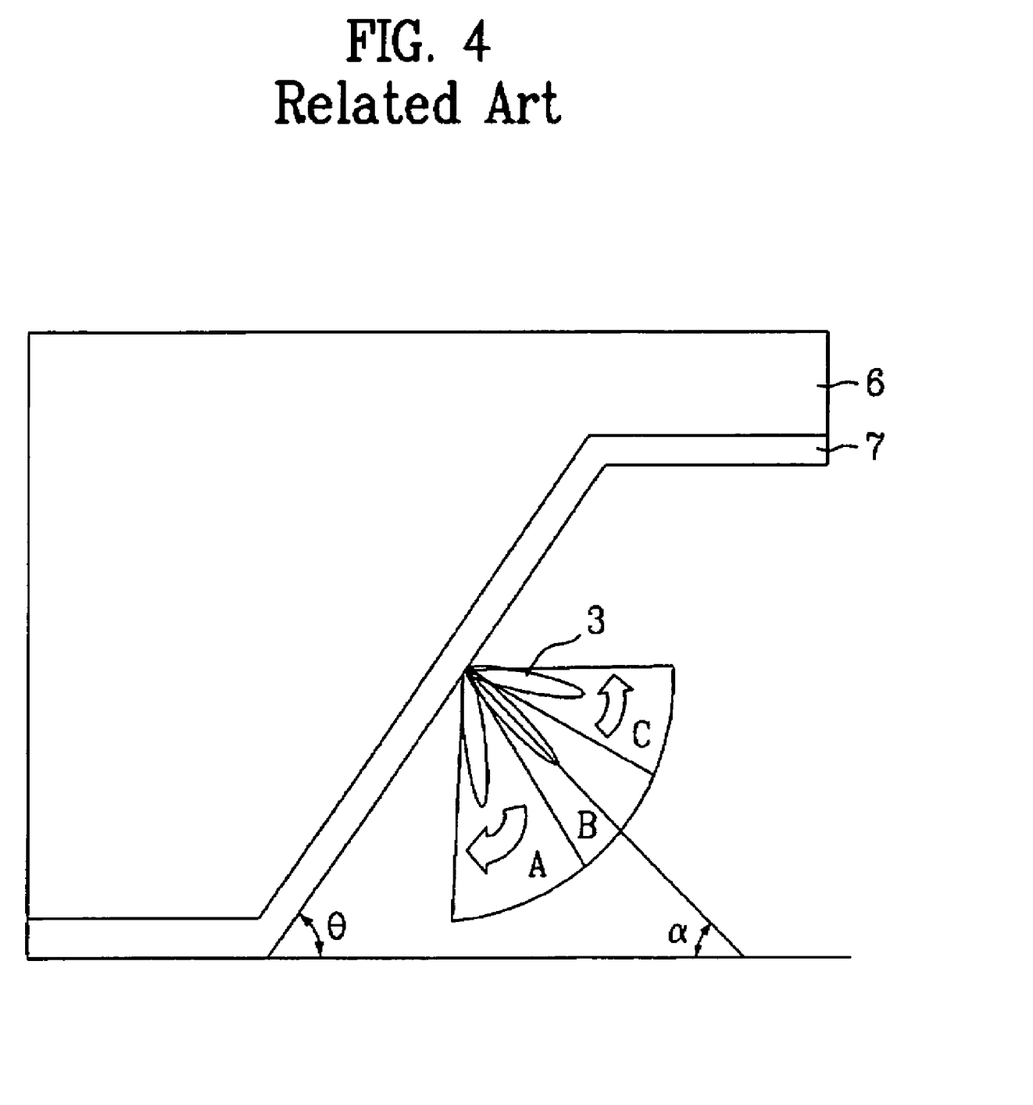
FIG. 4 is a cross sectional view illustrating a slope angle of a valley and an initial tilt angle of a liquid crystal molecule in a multi-domain LCD device according to the related art.

The valley 15 has a slope angle of about 60° relative to the surface of the second substrate 2. As shown in FIG. 4, as some molecules of the liquid crystal 3 enter into the valley 15, the molecules inside the valley 15 may be aligned in the vertical direction (B) to the slope surface of the valley 15, or may be tilted in the direction of (A) or (C), according to the electric field applied between the common electrode 7 and the pixel electrode.

However, the related art multi-domain LCD device has the following disadvantages.

The vertical alignment mode LCD device using the valley is suitable for obtaining a rapid response time. To form the valley of the LCD device, it is necessary to provide the mask which includes the semi-transmission part as well as the transmission and closed parts. Thus, the process requires an additional mask including the semi-transmission part for the valley, thereby increasing the manufacturing cost, and lowering the yield due to the photo process after forming the valley. In addition, even though the semi-transmission part of the mask is used in the general exposure process, it is difficult to maintain a uniform width and depth of the valleys in each region.

SUMMARY OF THE INVENTION

Accordingly, one object of the present invention is to address the above-noted and other problems of the related art.

Another object of the present invention is to provide a multi-domain LCD device, which includes a valley formed by irradiating a laser beam, and a simplified method for manufacturing the same.

To achieve these objects and other advantages and in accordance with the purpose of the invention, as embodied and broadly described herein, the present invention provides in one aspect a multi-domain liquid crystal display (LCD) device including first and second substrates facing each other, gate and data lines crossing each other on the first substrate to thereby form a pixel region, a pixel electrode formed in the pixel region of the first substrate, a laser-irradiated groove having a predetermined width and depth in the surface of the second substrate, a common electrode formed in the second substrate having a predetermined step coverage generated by the surface of the second substrate and the groove, and a liquid crystal layer formed between the first and second substrates.

In another aspect, the present invention provides a method for manufacturing a multi-domain LCD device, which includes method comprising forming gate and data lines crossing each other on a first substrate to thereby define a pixel region; forming a pixel electrode in the pixel region, in which the pixel electrode includes transmitting parts, forming a groove by applying a laser beam to a predetermined portion of a second substrate between the transmitting parts, forming a common electrode on the second substrate including the groove, bonding the first and second substrates to each other, and forming a liquid crystal layer between the first and second substrates.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 6:
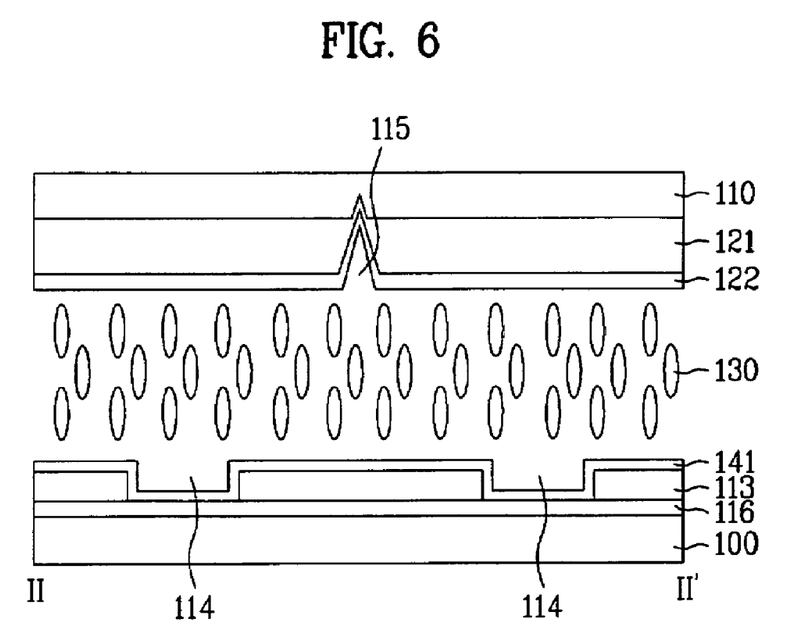
FIG. 6 is a cross sectional view illustrating a black state of a multi-domain LCD device along II-II' of FIG. 5.
Figure 7:
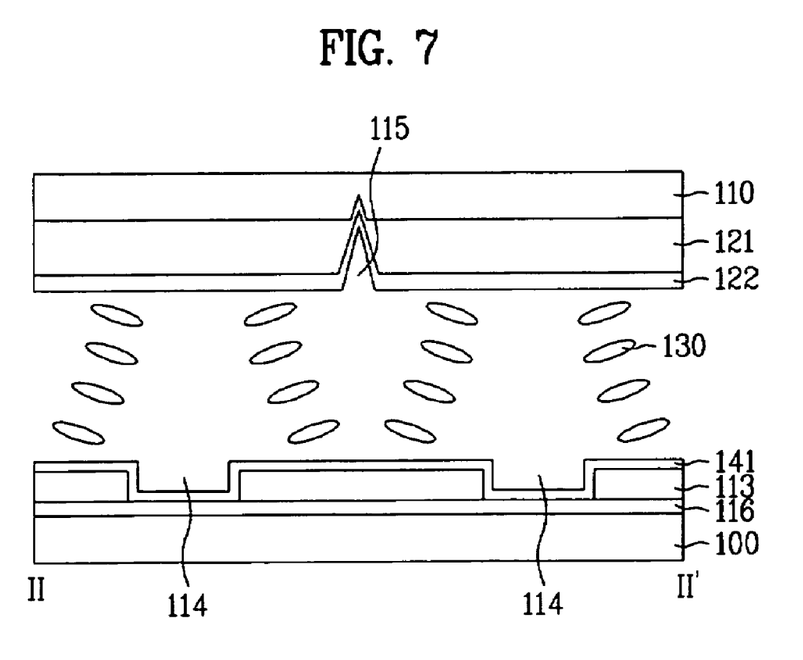
FIG. 7 is a cross sectional view illustrating a white state of a multi-domain LCD device along II-II' of FIG. 5.

As shown in FIGS. 6 and 7, the multi-domain vertical alignment (MVA) mode LCD device according to an embodiment of the present invention includes a first substrate 100 and a second substrate 110.

Figure 5:
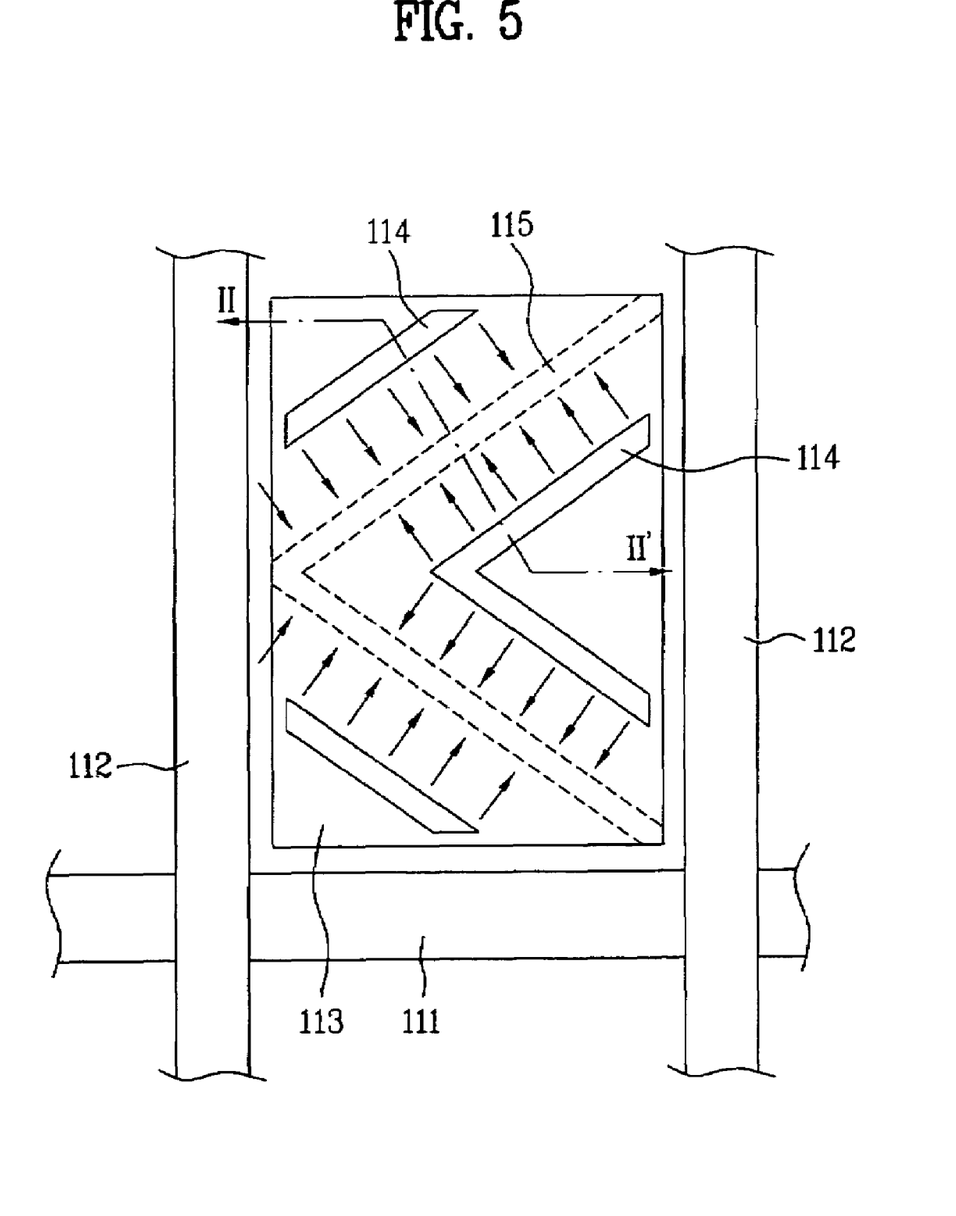
FIG. 5 is a plane view illustrating a multi-domain LCD device according to an embodiment of the present invention.

As shown in FIG. 5, the first substrate 100 includes a thin film transistor array having a gate line 111, a data line 112, a thin film transistor (not shown), and a pixel electrode 113. Further, the gate line 111 is formed perpendicular to the data line 112 to thereby define a unit pixel region. The thin film transistor is formed adjacent to a crossing portion of the gate and data lines 111 and 112. In addition, the pixel electrode 113 is formed in the unit pixel region and includes one or more transmitting parts 114 positioned at fixed intervals.

As shown in FIGS. 5 and 6, the second substrate 110 includes a color filter array having a black matrix layer (not shown), an R/G/B color filter layer 121 and a common electrode 122. Further, the black matrix layer excludes light from other portions except the pixel region (gate and data lines 111 and 112 of the first substrate 100). In addition, the R/G/B color filter layer 121 is formed corresponding to the pixel region of the first substrate 100 and the common electrode 122 is formed on an entire surface of the second substrate 110. In this instance, a valley 115 is formed in a surface of the second substrate 110 by applying a laser beam having a predetermined energy. As shown, the color filter layer 121 and the common electrode 122 have a predetermined step coverage corresponding to the valley 115 formed in the surface of the second substrate 110.

Further, an alignment layer 141 may be formed on facing surfaces of the first and second substrates 100 and 110, or may be formed on any one of the first and second substrates 100 and 110. The alignment layer 141 is also rubbed such that the alignment layer 141 has a vertical pretilt angle. In FIGS. 6 and 7, the alignment layer 141 is formed only on the first substrate 100.

The first substrate 100 also includes an insulating layer 116 having a gate insulating layer formed between the gate line 111 and the data line 112 and a passivation layer formed between the data line 112 and the pixel electrode 113.

In the MVA mode LCD device of the present invention, it is not necessary to use an additional mask to form the valley 115 when forming the color filter array. That is, the valley 115 is precisely formed in the predetermined portion of the second substrate 110 by applying the laser beam. Thus, it is possible to form the plurality of valleys with a fine width and depth at fixed intervals by a simple process.

Furthermore, the width and depth of valley 115 can be changed by controlling the energy intensity and the incident angle of laser beam. Thus, it is possible to realize optimal conditions relating the width and depth of valley 115.

In addition, the laser beam is applied only to predetermined portions of the second substrate 110 to form the valley 115 having the fine width and depth that is relatively smaller than the thickness of the second substrate 110. Thus, when applying the present invention to a large-sized substrate, the large-sized substrate has less damage generated by the valley 115. For example, the valley 115 is formed to have a thickness of about 1~1.5 µm, a width of about 1~3 µm, and a slope angle of about 30~80°.

Further, the multi-domain LCD device uses the liquid crystal 130 of a negative dielectric anisotropy. An alignment of the liquid crystal molecules when the multi-domain LCD device representing a black or white state by applying a voltage to the pixel electrode 113 will now be described.

The multi-domain LCD device according to an embodiment of the present invention is normally represented in a black mode. As shown in FIG. 6, during the voltage-off state, the multi-domain LCD device is in a black state. That is, the liquid crystal is aligned vertically due to the alignment layer 141 formed on the lower or upper substrate 100 or 110 and being rubbed in a vertical direction, whereby the LCD device is in the black state.

As the voltage is applied to the multi-domain LCD device, as shown in FIG. 7, a vertical electric field is generated between the common electrode 122 and the pixel electrode 113. Thus, molecules of the liquid crystal 130 are tilted adjacent to a horizontal surface of the substrate because the liquid crystal is aligned vertically to the electric field. In this instance, the vertical electric field may be distorted due to the valley 115 and the transmitting part 114. That is, an electric field of equipotential is tilted relative to the valley 115 and the transmitting part 114. Then, the liquid crystal 130 is aligned vertically to the equipotential line. At this time, the transmitting part 114 and the valley 115 function as a boundary between domains having different alignment directions of liquid crystal.

Figure 8:
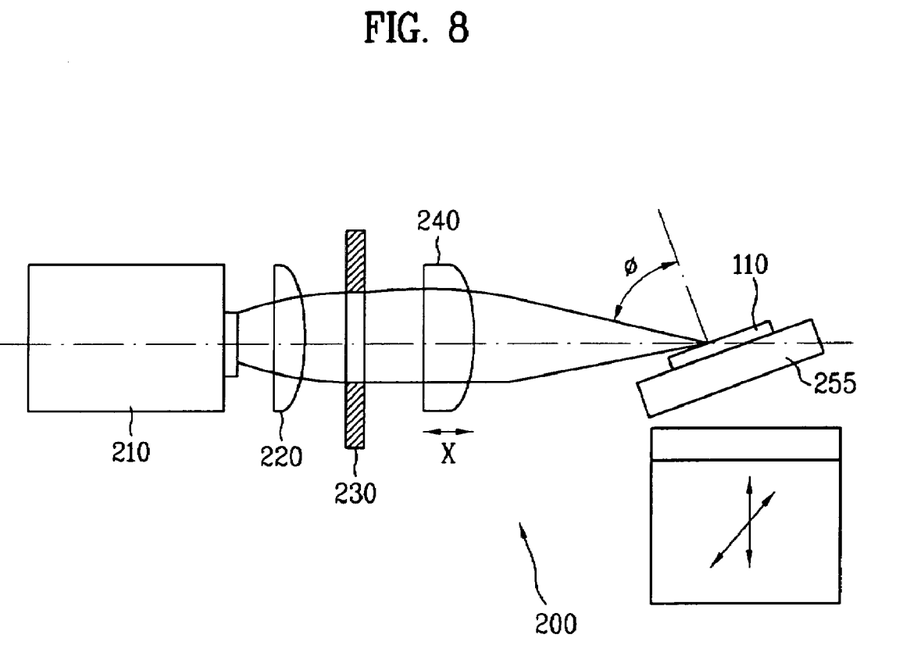
FIG. 8 is a schematic view illustrating a laser beam apparatus for forming a valley which is used when forming a multi-domain LCD device according to an embodiment of the present invention.

Next, FIG. 8 is a schematic view illustrating a laser beam apparatus for formatting a valley 115 in a multi-domain LCD device according to an embodiment of the present invention. As shown, the laser beam apparatus includes a light source (not shown) that generates a laser beam having a predetermined energy, an attenuator 210 that controls the laser beam to lower an energy level a telescope lens (not shown) that diffuses the laser beam, and a field lens 220 that changes a pattern of the laser beam based on a laser beam pattern mask. Further, the laser beam pattern mask 230 includes a predetermined pattern (corresponding to the valley 115) for selectively transmitting the laser beam. The beam apparatus also includes a projection lens 240 that reduces the laser beam transmitted through the laser beam pattern mask 230 by a predetermined reduction ratio and provides the predetermined laser beam pattern to the substrate.

In addition, the laser beam apparatus includes, for example, an eximer laser having a wavelength of 193 nm. Further, the laser beam apparatus emits a untreated laser beam that passes through the attenuator 210, the field lens 220, the projection lens 240, and the laser beam pattern mask 230 to thereby provide the predetermined laser beam pattern to the substrate 110.

At this time, the laser beam pattern mask 230 includes a transmitting part corresponding to a groove for defining the valley 15 in the surface of the second substrate 110. Thus, the interval between each transmitting part and the width of each transmitting part in the laser beam pattern mask 230 is controlled in consideration of the reduction ratio of the projection lens 240.

In addition, laser gas used for the laser beam is ArF, the wavelength of laser beam is 193 nm, and the energy of laser beam is 1.6~18 J/cm$^2$, for example. Also, the laser beam is incident on the surface of the second substrate 110 at the angle of about 50~80° relative to a vertical direction of the second substrate 110, whereby the slope angle of the valley formed in the surface of the second substrate 110 is about 30~80°.

As the incident angle of laser beam becomes vertical on the surface of the second substrate 110 (the laser beam is incident adjacently to the surface of the second substrate 110), it is easy to observe the valley from the surface of the second substrate 110. Further, a the second substrate 110 including the valley 115 is formed of quartz glass, crystal, or soda-lime glass, for example. The second substrate 110 may also be supported by a moveable support 255.

If soda-lime glass, is used, the intensity the wavelength and applying time of the laser beam is controlled because the absorption coefficient of soda-lime glass is relatively larger than the absorption coefficient of quartz glass or crystal.

Figure 9A:
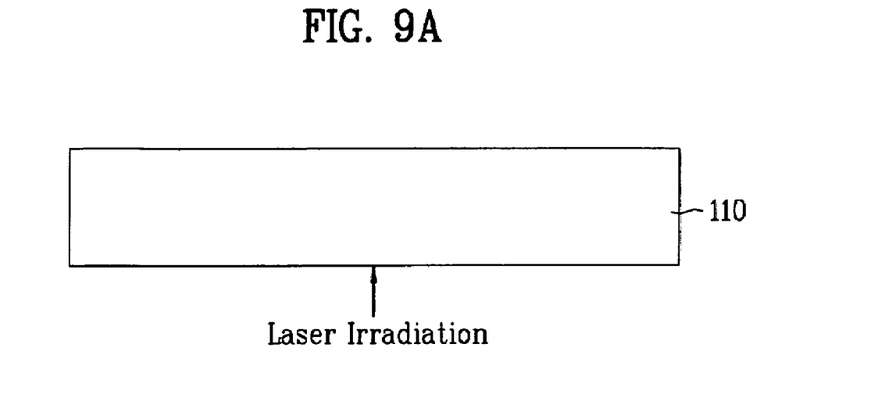
FIGS. 9A to 9C are cross sectional views illustrating a method for manufacturing a multi-domain LCD device according to an embodiment of the present invention.
Figure 9B:
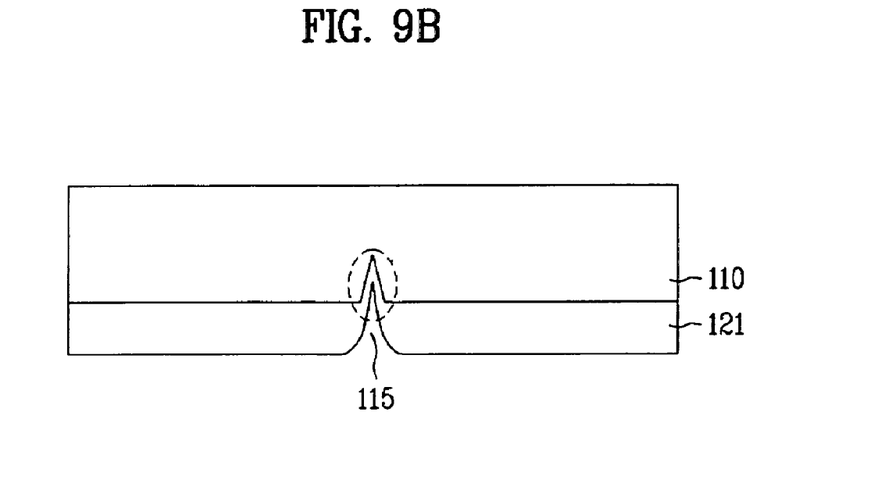
Figure 9C:
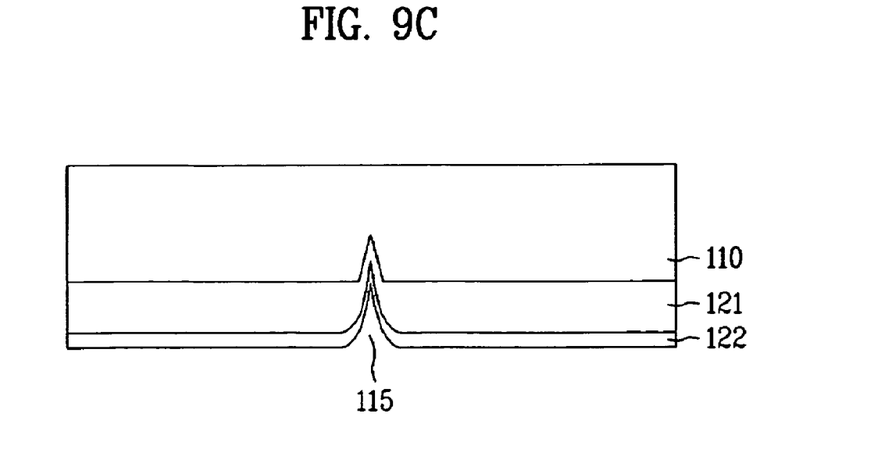

Turning next to FIGS. 9A to 9C, which are cross sectional views illustrating a method for manufacturing the valley 115 in the second substrate 110 of the multi-domain LCD device according to an embodiment of the present invention. As shown in FIG. 9A, the laser beam is applied to a predetermined portion of the prepared second substrate 110 using the laser beam apparatus as shown in FIG. 8. That is, the laser beam is selectively applied to the predetermined portion of the second substrate 110 to thereby form the groove in the predetermined portion of the second substrate 110.

In this example, the groove has a slope angle of about 30~80°, a critical dimension CD of about 1~3 μm, and a thickness of about 1~1.5 μm. Also, a pulse number of the irradiated laser beam is about 1~50 pulses, and the energy (E) of irradiated laser beam is about 1.6~18 J/cm$^2$. Further, the laser beam is irradiated such that the incident angle of laser beam is about 10~50° relative to the vertical direction of the substrate 110. That is, the width and depth of a fine groove can be controlled using the pulse number and energy intensity.

As the incident angle of laser beam becomes vertical on the surface of the second substrate 110 including the groove formed by laser beam (the laser beam is incident adjacently to the surface of the second substrate 110), it is easy to observe the groove in the surface of the second substrate 110.

Then, the black matrix layer (not shown) is formed on the second substrate 110 including the groove formed by irradiation of laser beam. That is, the black matrix layer is formed on the second substrate 110 corresponding to other portions except the pixel region (gate and data lines of the first substrate).

As shown in FIG. 9B, the color filter layer 121 is formed on the second substrate 110 including the black matrix layer at a position corresponding to the pixel region. Also, the color filter layer 121 is formed in the groove and thus has a predetermined step coverage generated by the groove.

Referring to FIG. 9C, the common electrode 122 is formed on the entire surface of the second substrate 110 including the black matrix layer and the color filter layer 121. After the common electrode 122 is formed, the portion having the groove is defined as the valley 115.

The above process explains the method of forming the color filter array on the second substrate 110.

After forming the color filter array on the second substrate 110, a thin film transistor array is formed on the first substrate 110. The thin film transistor array includes the gate line 111, the data line 112, the pixel electrode 113, and the thin film transistor. At this time, the gate line 111 is formed in perpendicular to the data line 112 to thereby define the pixel region. Then, the pixel electrode 113 is formed in the pixel region and includes the transmitting part 114 arranged in alternation with the valley 115. Further, the thin film transistor is formed adjacent to the crossing portion of the gate and data lines 111 and 112.

In addition, after bonding the oppositely separated first and second substrates, the liquid crystal layer is formed between the first and second substrates, thereby forming the multi-domain LCD device. The liquid crystal layer may be formed in an injection method or a dispensing method. In the dispensing method, the liquid crystal layer is formed first, and then the two substrates are bonded to each other. In addition, although only one groove or valley is shown in the figures, the LCD device includes a plurality of grooves or valleys spaced apart from each other at predetermined intervals.

As mentioned above, the multi-domain LCD device according to the present invention and the method for manufacturing the same have the following advantages.

In the MVA mode LCD device, the groove is formed in the surface of the color filter array substrate by irradiating a laser beam, to thereby form the valley in the surface of the color filter array substrate. In this instance, the valley can be formed in a desired width and depth. That is, the laser beam is applied only to the predetermined portions of the color filter array substrate, whereby it is suitable for forming the valley having a fine width and depth that is relatively smaller than the thickness of the color filter array substrate. Accordingly, it is possible to realize the uniform electric field and alignment of liquid crystal, thereby improving the quality of viewing angle.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for manufacturing a multi-domain LCD device, said method comprising:
   forming gate and data lines crossing each other on a first substrate to thereby define a pixel region;
   forming a pixel electrode in the pixel region, the pixel electrode including transmitting parts;
   forming a groove by applying a laser beam to a predetermined portion of a second substrate between the transmitting parts, the groove provided in alternation with the transmitting parts;
   forming a common electrode on the second substrate including the groove;
   bonding the first and second substrates to each other; and
   forming a liquid crystal layer between the first and second substrates,
   wherein a cross sectional shape of the groove is v-shaped and lengths of two sides of the groove are of equal length.

2. The method of claim 1, wherein a laser gas used when applying the laser beam is ArF.

3. The method of claim 1, wherein the laser beam used has a wavelength of about 193 nm.

4. The method of claim 1, wherein the laser beam used has an energy level of about 1.6-18J/cm$^2$.

5. The method of claim 1, further comprising:
   forming a black matrix layer on the second substrate after forming the groove, wherein the black matrix layer is non-overlapped xvith the pixel region.

6. The method of claim 1, further comprising:
   forming a color filter layer on the second substrate corresponding to the pixel region after forming the groove.

7. The method of claim 1, wherein the groove has a width of about 1-3 μm, and a slope of the groove is tilted in a surface of the second substrate about 30-80°.

8. The method of claim 1, wherein the groove has a depth of about 1-1.5 μm.

* * * * *